No. 764,593. PATENTED JULY 12, 1904.
O. E. JOHNSTON.
HUB FOR VEHICLES.
APPLICATION FILED APR. 25, 1904.
NO MODEL.

WITNESSES:
Jos. J. Hosler.
J. R. Bond.

INVENTOR
Oman E. Johnston
BY F. W. Bond
ATTORNEY

No. 764,593. Patented July 12, 1904.

UNITED STATES PATENT OFFICE.

OMAN E. JOHNSTON, OF BELLEVUE, OHIO.

HUB FOR VEHICLES.

SPECIFICATION forming part of Letters Patent No. 764,593, dated July 12, 1904.

Application filed April 25, 1904. Serial No. 204,687. (No model.)

*To all whom it may concern:*

Be it known that I, OMAN E. JOHNSTON, a citizen of the United States, residing at Bellevue, in the county of Huron and State of Ohio, have invented certain new and useful Improvements in Hubs for Vehicles; and I do hereby declare that the following is a full, clear, and exact description of the same, reference being had to the annexed drawings, making a part of this specification, and to the figures of reference marked thereon.

The present invention relates to improvements in hubs for vehicles especially designed to be mounted upon an axle and held in proper position without the use of an external nut or other fastening device.

Figure 1:
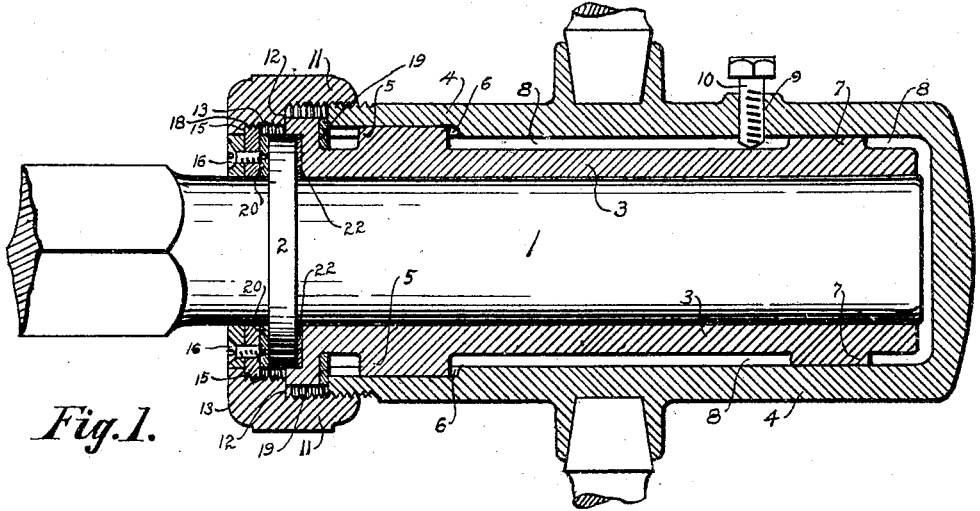
Figure 2:
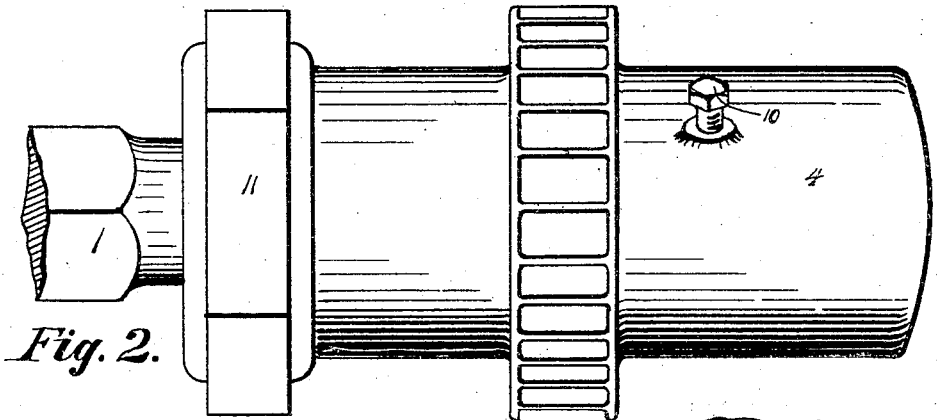
Figures 3, 4:
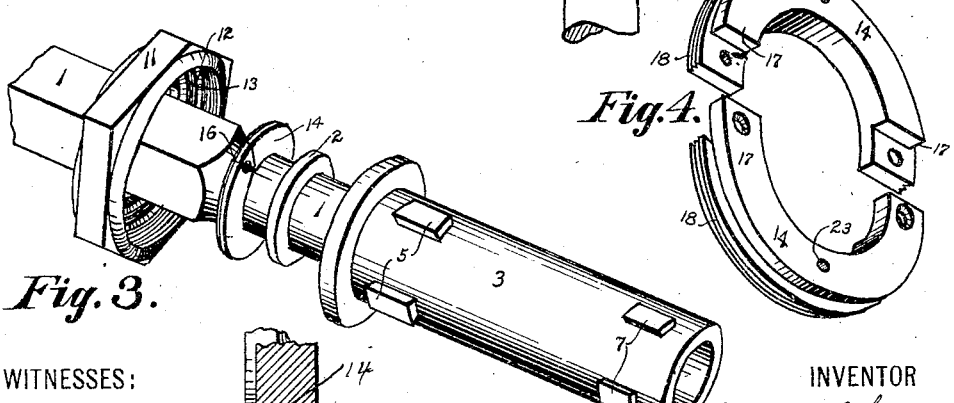
Figure 5:
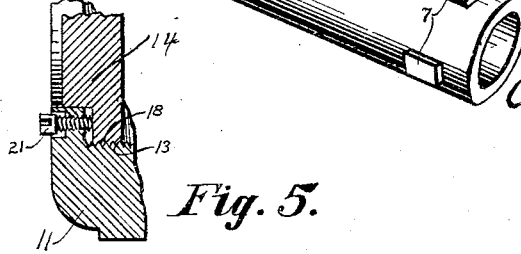

Figure 1 is a horizontal section of the hub and the different parts belonging thereto, showing the same mounted upon an axle. Fig. 2 is a side elevation showing the hub properly mounted upon an axle. Fig. 3 is a view showing a portion of the axle, the axle-box, the hub-retaining disk, and the coupling-nut located thereon, but disconnected. Fig. 4 is a detached view of the hub-retaining disk, showing the same separated. Fig. 5 is a view showing a portion of the coupling-nut, also a portion of the hub-retaining disk in relative position with the coupling-nut, and also showing a set-screw.

Similar numerals of reference indicate corresponding parts in all the figures of the drawings.

In the accompanying drawings, 1 represents the vehicle-axle, which is constructed in the ordinary manner, except that the outer ends of said axle are non-screw-threaded.

The axle 1 is provided with the usual collar 2, which collar is for the purpose of preventing any longitudinal movement of the hub after the hub has been properly connected, as hereinafter described.

Upon the axle 1 is mounted in the usual manner the axle-box 3, which axle-box is located in the hub 4 and concentrically therewith.

For the purpose of causing the axle-box 3 to rotate with the hub said axle-box is provided with the short ribs 5, which ribs are seated in the recesses 6, formed in the inner periphery of the hub.

For the purpose of holding the hub upon the axle-box at the outer end the ribs 7 are provided, which ribs are so formed that they will press or bear against the inner periphery of the hub.

For the purpose of providing the oil-chamber 8 the ribs 5 and 7 are formed of such a width that the outer periphery of the axle-box 3 and the inner periphery of the hub 4 will be spaced from each other, as illustrated in Fig. 1.

For the purpose of supplying oil to properly lubricate the bearing the aperture 9 is provided, which aperture is to be closed by means of the set-screw 10, which set-screw serves the double purpose of closing the oil-aperture 9 and assisting in holding the axle-box 3 and the hub 4 in fixed relative position.

It will be understood that the location of the aperture 9 and the set-screw 10 is immaterial, as their only purposes are to provide means for the introduction of oil and at the same time seating the set-screw 10 against the axle-box 3, thereby preventing any relative movement, as between the axle-box and the hub, by reason of any slight imperfection in the mechanical construction of the different parts.

The rear or inner end of the hub 4 is screw-threaded upon its outer periphery, as illustrated in Fig. 1, said screw-threads being for the purpose of engaging the screw-threads formed upon the inner periphery of the coupling-nut 11, said screw-threads so engaging the screw-threads formed upon the hub being formed upon the larger inner diameter of said coupling-nut.

The coupling-nut 11 is provided with the shoulder or flange 12, which shoulder or flange is adapted to abut against the inner end of the axle-box 3 or against an intervening washer, as the case may be.

The coupling-nut 11 is provided with screw-threads 13, formed upon the inner periphery of the small diameter of said coupling-nut, which screw-threads are for the purpose of holding or assisting in holding the hub-retaining disk or ring 14 in adjusted relative position with the coupling-nut 11.

The inner end or portion of the coupling-nut 11 is provided with the flange 15, which flange is so formed that the opening of the nut 11 will be substantially of the same diameter as the diameter of the collar 2 and is so formed for the purpose of allowing the coupling-nut 11 to be passed over the collar 2 before the hub 4, together with its different parts, is placed upon the axle.

It will be understood that in order to place the disk or ring 14 in the position illustrated in Fig. 1 it will be necessary to form the ring or disk in parts, so that the parts when disconnected can be placed around the axle and what might be termed "back" of the flange 2. After the disconnected parts of the ring 14 have been placed in proper position they are connected together by means of screws 16 or their equivalents, thereby constituting a continuous ring or disk.

For the purpose of properly closing the opening at the rear or inner end of the coupling-nut 11 the disk 14 is provided with the non-screw-threaded portion 17, which non-screw-threaded portion is formed of a diameter less than the diameter of the screw-threaded portion 18, as illustrated in Figs. 1 and 4.

After the sections of the disk or ring 14 have been properly connected the disk is connected to the coupling-nut 11 and constitutes a permanent part of the nut 11.

After the disk or ring 14 has been placed in proper position with reference to the coupling-nut 11 the washer 20 is placed in the position illustrated in Fig. 1, which washer should be an open one, so that it can be properly connected or placed in its position, after which the coupling-nut 11 is attached to the hub 4 by screw-threads, said coupling-nut being rotated until the flange 12 abuts against the inner end of the axle-box 3, thereby locking the nut 11 against rotation.

If in the event the disk 14 is not in proper position to securely hold the hub against longitudinal movement, said disk is adjusted by rotation until it is brought into proper position to hold the hub and coupling-nut against any longitudinal movement, but leaving the hub free to rotate, it being understood that the disk or ring 14 should be so adjusted to produce the desired frictional contact.

After the disk or ring 14 has been properly adjusted and to prevent any accidental displacement of said disk or ring the set-screw 21 or its equivalent may be employed to prevent any rotation of the ring or disk 14 independent of the coupling-nut 11. However, I do not desire to be confined to the special set-screw 21 herein shown or its location, as the only object is to provide means to firmly hold the ring or disk 14 in relative position with the coupling-nut 11.

It will be understood that the set-screw 21 or other equivalent device is to be brought into use only after the proper and desired adjustment of the ring or disk 14 has been made.

It will be understood that by providing means for adjusting the disk or ring 14 within the coupling-nut 11 provision is made for washers of different thickness and at the same time taking up any wear of the same from use.

The hub 4 is closed at its outer end, and by spacing the hub from the axle-box an oil-reservoir is provided which will contain sufficient amount of oil for a considerable length of time, as it will be understood that no oil can escape from the inner end of the hub, that the oil will be retained by means of the washers 19, 20, and 22, the washer 22 being located between the inner face of the collar 2 and the inner abutting end of the axle-box 3.

For the purpose of providing means for adjusting the disk or ring 14 the sections composing said ring may be provided with the apertures 23, which will receive a pronged wrench.

I do not, however, desire to be confined to the peculiar manner or way of adjusting the ring or disk, but have described one way in which it may be adjusted.

The washer 19 is located against the outer face of the annular flange formed upon the inner end of the axle-box and the open end of the hub and is so located for the purpose of preventing the escape of oil from the oil-chamber.

Having fully described my invention, what I claim as new, and desire to secure by Letters Patent, is—

1. The combination of a hub and an axle-box located therein, an axle provided with a fixed collar, a coupling-nut having a differentiated inner diameter, said differentiated inner diameter provided with screw-threads, a hub-retaining disk or ring having a screw-threaded periphery, and said ring or disk carried by the coupling-nut and located upon the outer face of the collar of the axle, and means for locking the retaining-disk in fixed adjustment with the coupling-nut, substantially as and for the purpose specified.

2. The combination of a hub and an axle-box located therein, an axle provided with a fixed collar, a coupling-nut having differentiated inner diameters, said differentiated inner diameters provided with screw-threads, a divided hub-retaining disk or ring having screw-threaded periphery, and said divided ring or disk carried by the coupling-nut and located upon the outer face of the fixed collar of the axle, substantially as and for the purpose specified.

3. A hub closed at one end and open at its opposite end, an axle-box fitting in and interlocking with said hub and provided with an annular flange, a coupling-nut secured to the hub and having differentiated diameters, a washer clamped between the annular flange of the axle-box and the hub, and an axle provided with a fixed collar, substantially as and for the purpose specified.

4. The combination of a hub and an axle-box located therein, an axle provided with a fixed collar, a coupling-nut having differentiated inner diameters, said differentiated inner diameters provided with screw-threads, a hub-retaining disk or ring having a screw-threaded periphery, and said ring or disk carried by the coupling-nut and located upon the outer face of the fixed collar of the axle, substantially as and for the purpose specified.

In testimony that I claim the above I have hereunto subscribed my name in the presence of two witnesses.

OMAN E. JOHNSTON.

Witnesses:
J. A. JEFFERS,
F. N. BOND.